US009467596B2

(12) United States Patent
Kageta

(10) Patent No.: US 9,467,596 B2
(45) Date of Patent: Oct. 11, 2016

(54) IMAGE-PROCESSING APPARATUS, IMAGE-PROCESSING METHOD, AND COMPUTER PROGRAM PRODUCT

(71) Applicant: PFU Limited, Ishikawa (JP)

(72) Inventor: Yukihiro Kageta, Ishikawa (JP)

(73) Assignee: PFU LIMITED, Ishikawa (JP)

( * ) Notice: Subject to any disclaimer, the term of this patent is extended or adjusted under 35 U.S.C. 154(b) by 0 days.

(21) Appl. No.: 14/618,783

(22) Filed: Feb. 10, 2015

(65) Prior Publication Data

US 2016/0127607 A1 May 5, 2016

(30) Foreign Application Priority Data

Oct. 31, 2014 (JP) ................... 2014-223684

(51) Int. Cl.
*H04N 1/04* (2006.01)
*H04N 1/40* (2006.01)

(52) U.S. Cl.
CPC ..................... *H04N 1/40* (2013.01)

(58) Field of Classification Search
CPC ............ G06F 19/321; G06F 17/3002; G06F 17/30029; G06F 17/30038; G06F 17/30247; G06F 17/50; G06F 17/5095; G06F 19/3437; G06F 19/345; G06F 1/1626; G06F 1/1632; G06F 21/32; G06F 21/36; G06F 21/602
USPC ............ 382/195, 154, 167, 300, 110, 274; 348/E13.001, E13.002, E13.037, 297; 358/463
See application file for complete search history.

(56) References Cited

U.S. PATENT DOCUMENTS

| | | | | |
|---|---|---|---|---|
| 5,448,502 A | * | 9/1995 | Kindo | H04N 17/02 348/E17.004 |
| 5,956,432 A | * | 9/1999 | Ohta | 382/264 |
| 2003/0072044 A1 | * | 4/2003 | Hashiguchi et al. | 358/520 |
| 2004/0022444 A1 | * | 2/2004 | Rhoads | G06K 9/00577 382/232 |
| 2004/0105595 A1 | * | 6/2004 | Watanabe | G06T 5/008 382/274 |
| 2005/0089218 A1 | * | 4/2005 | Chiba | G06K 9/4652 382/165 |
| 2006/0132483 A1 | * | 6/2006 | Ohishi | 345/419 |
| 2007/0188816 A1 | * | 8/2007 | Hayaishi | 358/3.26 |
| 2010/0026722 A1 | * | 2/2010 | Kondo | G09G 3/2007 345/660 |
| 2010/0111414 A1 | * | 5/2010 | Aragaki et al. | 382/167 |
| 2011/0002704 A1 | * | 1/2011 | Fujita | 399/74 |
| 2011/0043670 A1 | * | 2/2011 | Azuma et al. | 348/279 |
| 2012/0127270 A1 | * | 5/2012 | Zhang | G06T 7/0071 348/43 |

(Continued)

FOREIGN PATENT DOCUMENTS

| | | |
|---|---|---|
| JP | 07-044709 A | 2/1995 |
| JP | 2003-505893 A | 2/2003 |

(Continued)

OTHER PUBLICATIONS

Notice of Rejection Japanese Patent Application No. 2014-223684 dated Dec. 22, 2015 with full English translation.

*Primary Examiner* — Negussie Worku
(74) *Attorney, Agent, or Firm* — McDermott Will & Emery LLP

(57) ABSTRACT

An image-processing apparatus includes a correlation coefficient calculating unit that generates two-dimensional distribution of color information of color image data on a two-dimensional plane in a three-dimensional color space and calculates a correlation coefficient related to the two-dimensional distribution, and a correlation coefficient determining unit that determines the color image data as color convertible image data based on the correlation coefficient.

19 Claims, 10 Drawing Sheets

| CORRELATION COEFFICIENT | POINT |
|---|---|
| 1.0 TO 0.9 | 10 |
| 0.9 TO 0.8 | 5 |
| 0.8 TO 0.7 | 3 |
| 0.7 TO 0.6 | 1 |
| 0.6 TO 0.0 | 0 |

(56) References Cited

U.S. PATENT DOCUMENTS

| | | | |
|---|---|---|---|
| 2012/0155753 A1* | 6/2012 | Masato | H04N 9/735 382/162 |
| 2012/0229677 A1* | 9/2012 | Ugawa et al. | 348/234 |
| 2014/0046187 A1* | 2/2014 | Taniguchi et al. | 600/444 |
| 2016/0127594 A1* | 5/2016 | Kageta | H04N 1/04 358/474 |

FOREIGN PATENT DOCUMENTS

| | | |
|---|---|---|
| JP | 2005-313634 A | 11/2005 |
| JP | 2010-119006 A | 5/2010 |
| JP | 2010-120290 A | 6/2010 |
| JP | 2011-019204 A | 1/2011 |
| JP | 2012-254557 A | 12/2012 |
| JP | 2014-030083 A | 2/2014 |
| WO | 00/02378 A1 | 1/2000 |

* cited by examiner

FIG.10

| R | G | B | PRESENT OR ABSENT |
|---|---|---|---|
| 0 | 0 | 0 | PRESENT |
|   |   | 1 | PRESENT |
|   |   | ⋮ | ⋮ |
|   |   | 31 | ABSENT |
|   | 1 | ⋮ | ⋮ |
|   | ⋮ | ⋮ | ⋮ |
|   | 31 | ⋮ | ⋮ |
| 1 | ⋮ | ⋮ | ⋮ |
| ⋮ | ⋮ | ⋮ | ⋮ |
| 31 | ⋮ | ⋮ | ⋮ |

| CORRELATION COEFFICIENT | POINT |
|---|---|
| 1.0 TO 0.9 | 10 |
| 0.9 TO 0.8 | 5 |
| 0.8 TO 0.7 | 3 |
| 0.7 TO 0.6 | 1 |
| 0.6 TO 0.0 | 0 |

IMAGE-PROCESSING APPARATUS, IMAGE-PROCESSING METHOD, AND COMPUTER PROGRAM PRODUCT

CROSS-REFERENCE TO RELATED APPLICATION

This application is based upon and claims the benefit of priority from Japanese Patent Application No. 2014-223684, filed on Oct. 31, 2014, the entire contents of which are incorporated herein by reference.

BACKGROUND OF THE INVENTION

1. Field of the Invention

The present disclosure relates to an image-processing apparatus, an image-processing method, and a computer program product.

2. Description of the Related Art

Conventional techniques have been disclosed for performing color/monochrome determination of an image.

Here, a technique is disclosed for determining an input image as any of a color image, a monochrome image, and an image with color and monochrome mixed, and subjecting the input image to color conversion (refer to JP-A-2010-120290).

However, conventional image-processing apparatuses (such as disclosed in JP-A-2010-120290) have problems in that it is difficult to determine the number of chromatic colors included in an image and a percentage of the chromatic colors in the entire image. Especially when the number of colors in the image is small, the conventional image-processing apparatuses cannot easily determine that the number of colors is small.

SUMMARY OF THE INVENTION

It is an object of the present disclosure to at least partially solve the problems in the conventional technology.

An image-processing apparatus according to one aspect of the present disclosure includes a correlation coefficient calculating unit that generates two-dimensional distribution of color information of color image data on a two-dimensional plane in a three-dimensional color space and calculates a correlation coefficient related to the two-dimensional distribution, and a correlation coefficient determining unit that determines the color image data as color convertible image data based on the correlation coefficient.

An image-processing method according to another aspect of the present disclosure includes a correlation coefficient calculating step of generating two-dimensional distribution of color information of color image data on a two-dimensional plane in a three-dimensional color space and calculating a correlation coefficient related to the two-dimensional distribution, and a correlation coefficient determining step of determining the color image data as color convertible image data based on the correlation coefficient.

A computer program product according to still another aspect of the present disclosure is a computer program product having a non-transitory tangible computer readable medium including programmed instructions for causing, when executed by a computer, the computer to perform an image-processing method including a correlation coefficient calculating step of generating two-dimensional distribution of color information of color image data on a two-dimensional plane in a three-dimensional color space and calculating a correlation coefficient related to the two-dimensional distribution, and a correlation coefficient determining step of determining the color image data as color convertible image data based on the correlation coefficient.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a diagram of an example of color distribution according to the embodiment;

DETAILED DESCRIPTION OF THE EXEMPLARY EMBODIMENTS

The following explains an embodiment of an image-processing apparatus, an image-processing method, and a computer program product according to the present disclosure in detail based on the drawings. The present disclosure is not limited to the embodiment.

Configuration of Embodiment

Figure 1:
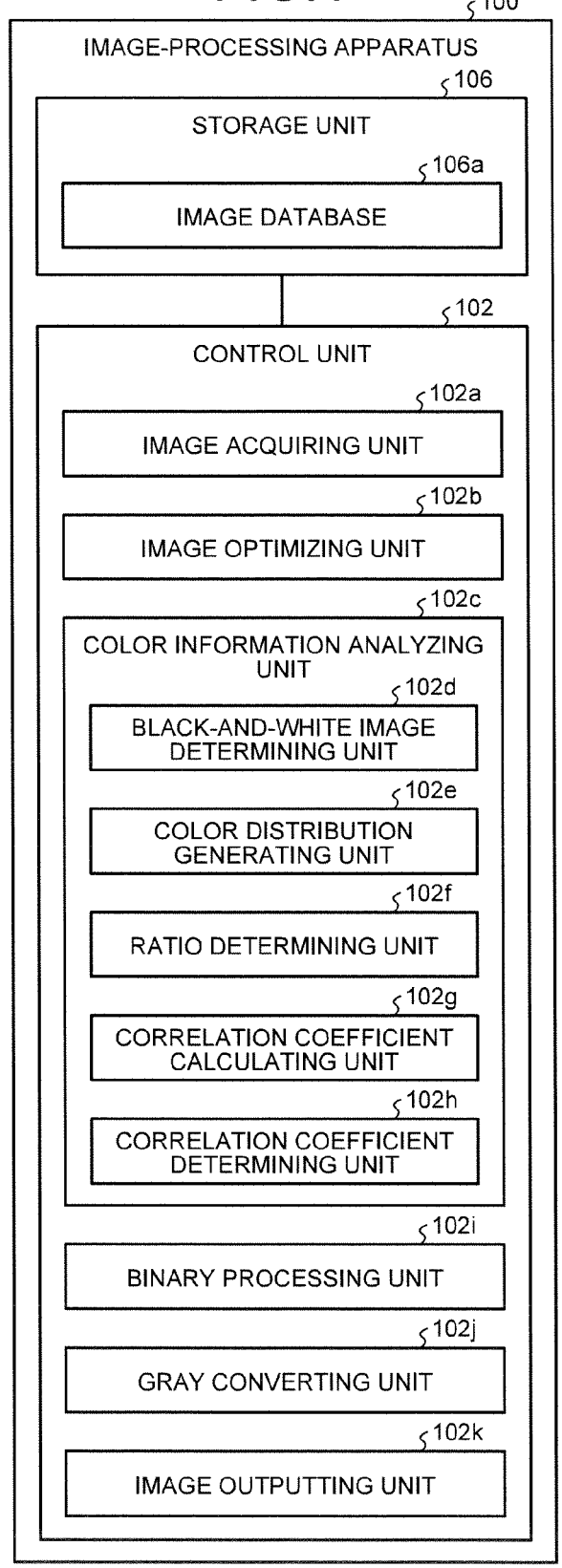
FIG. 1 is a block diagram of a configuration example of an image-processing apparatus according to an embodiment.

The following explains a configuration example of an image-processing apparatus 100 according to the embodiment of the present disclosure with reference to FIG. 1. Thereafter, processing and the like according to the embodiment will be explained in detail. The following embodiment exemplifies the image-processing apparatus 100 for embodying a technical idea of the present disclosure, and does not intend to limit the present disclosure to the image-processing apparatus 100. The following embodiment can equally be applied to the image-processing apparatus 100 according to other embodiments encompassed within the claims.

For example, the functional distribution of the image-processing apparatus 100 exemplified in the embodiment is not limited to those explained below. Functions may be functionally or physically distributed or integrated in any unit to an extent that the same effects or functions can be obtained. FIG. 1 is a block diagram of a configuration example of the image-processing apparatus 100 according to the embodiment.

As shown in FIG. 1, the image-processing apparatus 100 generally includes a control unit 102 and a storage unit 106. The image-processing apparatus 100 may further include an input/output unit 112 (not shown in FIG. 1). The respective units of the image-processing apparatus 100 are communicably connected to each other via any channel.

The image-processing apparatus 100 according to the embodiment may be coupled to a scanner device 200 (not shown in FIG. 1). The image-processing apparatus 100 may include the scanner device 200 in a housing.

The scanner device 200 may be a document scanner device of a manual insertion paper feeding type (continuous document feeder (CDF) type), a document scanner device of an automatic document feeder type (ADF type), a flat-bed type document scanner device, an overhead type image reading device, or the like.

The scanner device 200 may be connected to the image-processing apparatus 100 via an input/output interface unit 108 (not shown in FIG. 1). The image-processing apparatus 100 may further include a communication interface unit 104 (not shown in FIG. 1), and be connected to an external device (such as the scanner device 200) to be communicable with each other via the communication interface unit 104.

The communication interface unit 104 is an interface (such as a network interface card (NIC)) connected to a communication device such as any one or both of an antenna and a router connected to any one or both of a communication line and a telephone line, and may have a function that controls communication between the image-processing apparatus 100 and a network 300. The network 300 includes telecommunication and the like such as any one or both of wired communication and wireless communication (such as Wireless Fidelity (WiFi)).

The input/output unit 112 performs input/output (I/O) of data. For example, the input/output unit 112 may be a key input unit, a touch panel, a control pad (such as a touch pad and a game pad), a mouse, a keyboard, a microphone, and the like. The input/output unit 112 may be a display unit (such as a display, monitor, and a touch panel including liquid crystals or organic electroluminescence (EL)) that displays a display screen of an application and the like. The input/output unit 112 may be a voice output unit (such as a speaker) that outputs voice information as a voice.

The control unit 102 may control the communication interface unit 104, the input/output interface unit 108, and the input/output unit 112.

The storage unit 106 stores any one, some, or all of various databases, tables, files (such as an image database 106a), and the like. The storage unit 106 may store various application programs (such as a user application).

The storage unit 106 is used for storage. Examples of the storage unit 106 include any one, some, or all of a memory such as a random access memory (RAM) and a read only memory (ROM), a fixed disk device such as a hard disk, a solid state drive (SSD), a flexible disk, and an optical disc. A computer program and the like that give a command to a central processing unit (CPU) and perform various pieces of processing are recorded in the storage unit 106.

Among constituent elements of the storage unit 106, the image database 106a stores image data. The image data may be monochrome image data including black-and-white image data, color image data, binary image data, gray scale image data, or the like. The image data may be data read by the scanner device 200.

The control unit 102 includes a CPU and the like that totally control the image-processing apparatus 100. The control unit 102 includes an internal memory that stores a control program, a computer program that specifies various processing procedures and the like, and required data, and performs information processing to execute various pieces of processing based on these computer programs.

The control unit 102 can be broadly classified into an image acquiring unit 102a, an image optimizing unit 102b, a color information analyzing unit 102c, a binary processing unit 102i, a gray converting unit 102j, and an image outputting unit 102k.

The image acquiring unit 102a acquires image data. The image acquiring unit 102a may acquire the image data read by the scanner device 200. The image acquiring unit 102a may also acquire the image data from a higher program layer.

That is, the image acquiring unit 102a may acquire, from the higher program layer, image data acquired from the scanner device 200 as a determination target. The image acquiring unit 102a may store the image data in the image database 106a.

The image optimizing unit 102b optimizes any one or both of a pixel included in the image data and a data size. That is, when the size of the acquired image data is large, the image optimizing unit 102b may reduce the size to be analyzable and convert the image size into an appropriate size.

The color information analyzing unit 102c analyzes the image data based on the color information of each pixel included in the image data. The color information analyzing unit 102c includes at least a black-and-white image determining unit 102d, a color distribution generating unit 102e, a ratio determining unit 102f, a correlation coefficient calculating unit 102g, and a correlation coefficient determining unit 102h.

The black-and-white image determining unit 102d determines that the image data is color image data or black-and-white image data based on the color information of the image data. The black-and-white image determining unit 102d may determine that the image data is color image data or black-and-white image data based on the color information of the image data read by the scanner device 200.

The black-and-white image determining unit 102d may determine that the image data is color image data or monochrome image data based on the color information of the image data (color information of each pixel included in the image data). The black-and-white image determining unit 102d may notify the higher program layer of a determination result.

The color distribution generating unit 102e generates three-dimensional distribution of the color information of the color image data in a three-dimensional color space, and acquires number of colors in the color image corresponding to the color image data based on the three-dimensional distribution.

The color distribution generating unit 102e may acquire converted color information obtained by converting the color information of the color image data in the three-dimensional color space into a specific gradation, and generate the three-dimensional distribution of the converted color information in the three-dimensional color space.

The color distribution generating unit 102e may acquire the converted color information obtained by converting color information of the color image data in the three-dimensional color space from 256 gradations into 32 gradations, and generate the three-dimensional distribution of the converted color information in the three-dimensional color space. The three-dimensional color space may be an RGB color space, an HSV color space, a YUV color space, or the like.

That is, the color distribution generating unit 102e may change each piece of 256-gradation data of RGB included in the image data into a specific gradation (32 gradations) of data to summarize pixels having an approximate color, and acquire information about whether the color information is present in the three-dimensional space of RGB.

When a ratio of the number of colors in the color image corresponding to the color image data to total number of colors corresponding to the three-dimensional color space is less than a predetermined value, the ratio determining unit 102f determines the color image data as color convertible image data.

That is, the ratio determining unit 102f checks the number of color types detected by the color distribution generating unit 102e. When the number of color types is less than a predetermined threshold, the ratio determining unit 102f may determine the data as color convertible image data including monochrome image data and the like because the number of color types is small.

The correlation coefficient calculating unit 102g generates two-dimensional distribution of the color information of the color image data on a two-dimensional plane in the three-dimensional color space, and calculates the correlation coefficient related to the two-dimensional distribution. The correlation coefficient calculating unit 102g may generate three pieces of the two-dimensional distribution of the color information of the color image data on the two-dimensional plane in the three-dimensional color space, and calculate correlation coefficients related to three pieces of the two-dimensional distribution.

The correlation coefficient calculating unit 102g may generate the two-dimensional distribution of the color information of the color image data on the two-dimensional plane in the three-dimensional color space, and linearly approximate the two-dimensional distribution using a method of least squares to calculate the correlation coefficient.

The correlation coefficient calculating unit 102g may acquire converted color information obtained by converting the color information of the color image data into a specific gradation in the three-dimensional color space, generate the two-dimensional distribution of the converted color information on the two-dimensional plane, and calculate the correlation coefficient related to the two-dimensional distribution.

The correlation coefficient calculating unit 102g may acquire converted color information obtained by converting the color information of the color image data in the three-dimensional color space from 256 gradations into 32 gradations, generate the two-dimensional distribution of the converted color information on the two-dimensional plane, and calculate the correlation coefficient related to the two-dimensional distribution. The correlation coefficient may be a Pearson's product-moment correlation coefficient, a Spearman's rank correlation coefficient, or a Kendall's rank correlation coefficient.

The correlation coefficient determining unit 102h determines the color image data as the color convertible image data based on the correlation coefficient related to the two-dimensional distribution. When the correlation coefficient related to the two-dimensional distribution is equal to or more than a predetermined threshold, the correlation coefficient determining unit 102h may determine the color image data as the color convertible image data.

When a point calculated based on the correlation coefficient related to the two-dimensional distribution is equal to or more than the predetermined threshold, the correlation coefficient determining unit 102h may determine the color image data as the color convertible image data. When all of the correlation coefficients related to the two-dimensional distribution are equal to or more than the predetermined threshold, the correlation coefficient determining unit 102h may determine the color image data as the color convertible image data.

When sum of points calculated based on all of the correlation coefficients related to the two-dimensional distribution is equal to or more than the predetermined threshold, the correlation coefficient determining unit 102h may determine the color image data as the color convertible image data.

In this way, the color information analyzing unit 102c may optimize the color information and calculate the correlation coefficients of RG/GR/BG in a two-dimensional space regarding the color information of each pixel included in the image data, and determine an image type according to the color information of the image data. The color information analyzing unit 102c may notify the higher program layer of the determination result of the image data.

The binary processing unit 102i binarizes the color convertible image data to acquire binary image data. The binary processing unit 102i may store the binary image data in the image database 106a.

The gray converting unit 102j converts the color convertible image data into gray scale image data. The gray converting unit 102j may store the gray scale image data in the image database 106a.

The image outputting unit 102k outputs the image data. The image outputting unit 102k may output the image data via the input/output unit 112.

Processing According to Embodiment

The following explains an example of the processing performed by the image-processing apparatus 100 configured as explained above with reference to FIGS. 2 to 13.

Processing (Part 1)

Figure 2:
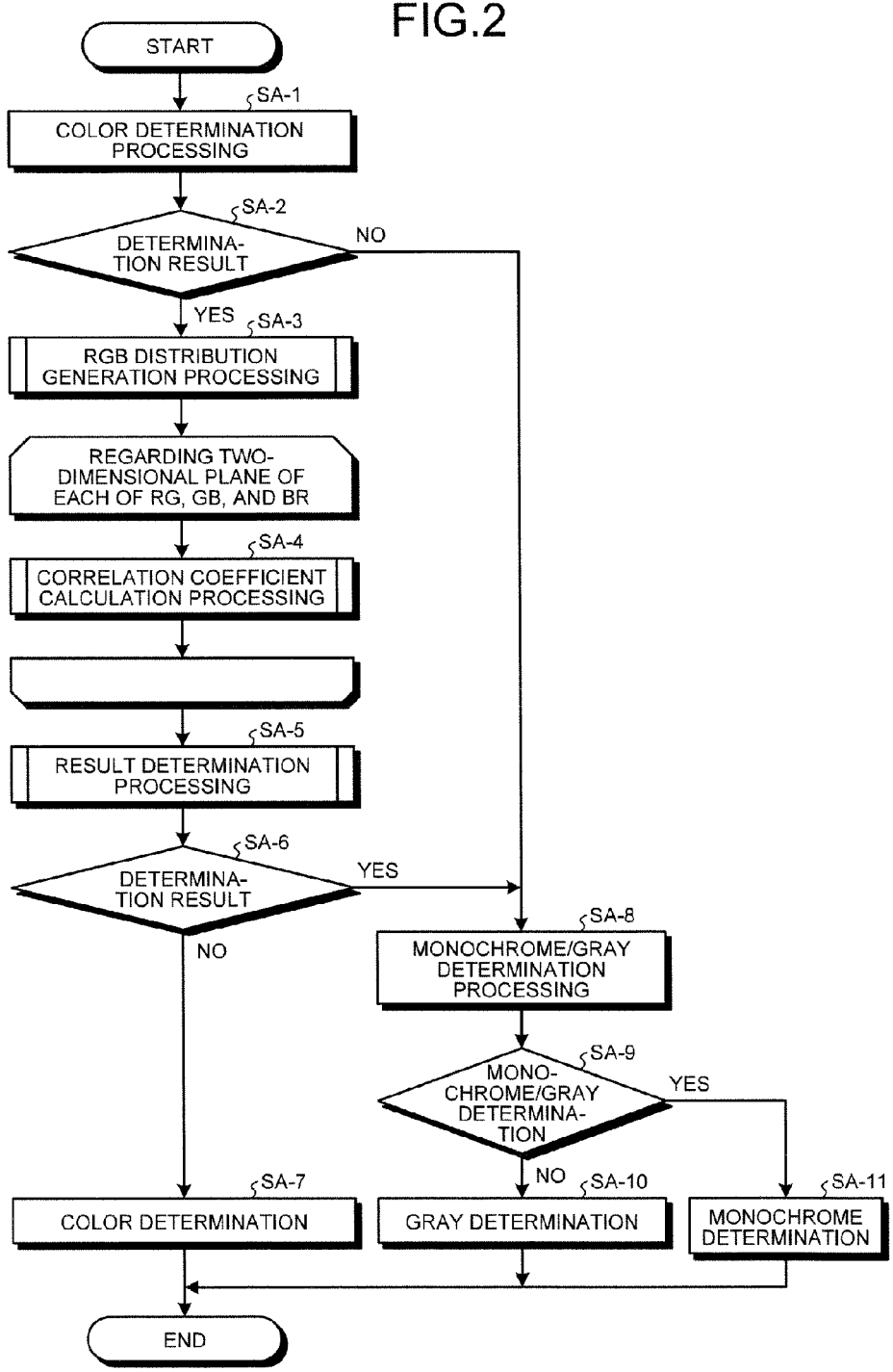
FIG. 2 is a flowchart of an example of processing in the image-processing apparatus according to the embodiment.

First, the following explains an example of the processing in the image-processing apparatus 100 according to the embodiment with reference to FIGS. 2 to 7. FIG. 2 is a flowchart of an example of the processing in the image-processing apparatus 100 according to the embodiment.

As shown in FIG. 2, the black-and-white image determining unit 102d first performs determination processing to determine whether the image data is color image data or black-and-white image data based on the color information of each pixel included in the image data acquired by the image acquiring unit 102a from the scanner device 200 (Step SA-1).

The black-and-white image determining unit 102d determines whether the image data is the color image data based on the determination result at Step SA-1 (Step SA-2). The black-and-white image determining unit 102d may determine whether the image data is a color image (image including a chromatic color) through an existing mono-color determination process.

If the black-and-white image determining unit 102d determines that the image data is not color image data (the image data is the black-and-white image data) (No at Step SA-2), the processing is shifted to Step SA-8.

On the other hand, if the black-and-white image determining unit 102d determines that the image data is the color image data (Yes at Step SA-2), the processing is shifted to Step SA-3.

The correlation coefficient calculating unit 102g acquires converted color information obtained by converting the color information of the color image data in the RGB color space from 256 gradations into 32 gradations, and generates three pieces of two-dimensional distribution of the converted color information on the two-dimensional plane (Step SA-3).

That is, the correlation coefficient calculating unit 102g may change each piece of 256-gradation data of RGB into a specific gradation (32 gradations) to summarize pixels having an approximate gradation value, record whether the color information is present in the three-dimensional space of RGB, and generate the RGB color distribution.

The correlation coefficient calculating unit 102g calculates the correlation coefficient related to the two-dimensional distribution of each of RG, GB, and BR on the two-dimensional plane (Step SA-4). That is, the correlation coefficient calculating unit 102g may calculate the correlation coefficient according to RGB distribution.

Figure 3:
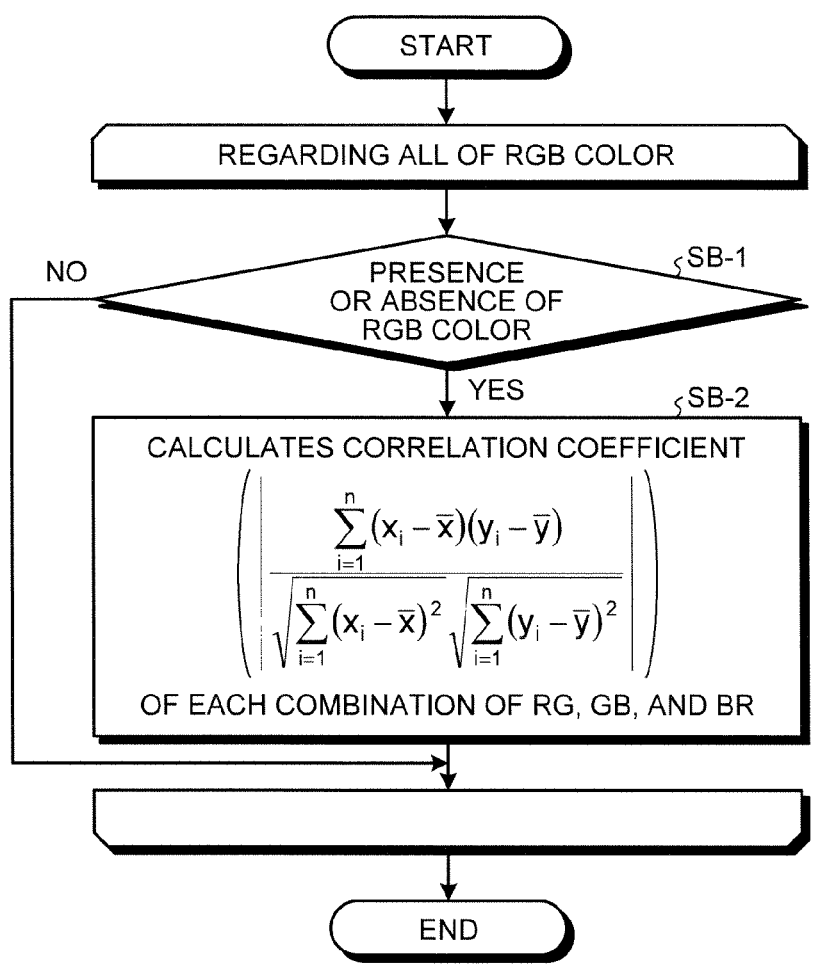
FIG. 3 is a flowchart of an example of the processing in the image-processing apparatus according to the embodiment.

The following explains an example of correlation coefficient calculation processing according to the embodiment with reference to FIG. 3. FIG. 3 is a flowchart of an example of the processing in the image-processing apparatus 100 according to the embodiment.

As shown in FIG. 3, the color information analyzing unit 102c first determines whether an RGB color is present regarding all of RGB colors, that is, whether the image data is color image data, based on the color information of the image data (Step SB-1).

If the color information analyzing unit 102c determines that the RGB color is not present, that is, the image data is not color image data (No at Step SB-1), the processing is ended.

On the other hand, if the color information analyzing unit 102c determines that the RGB color is present, that is, the image data is color image data (Yes at Step SB-1), the correlation coefficient calculating unit 102g generates three pieces of two-dimensional distribution of the color information of the image data on the two-dimensional plane in the RGB color space, calculates the Pearson's product-moment correlation coefficient of each combination of RG, GB, and BR (Step SB-2), and the processing is ended.

In the expression shown in FIG. 3, (x, y) indicates each value of (R, G), (G, B), or (B, R), and n may indicate the total number of colors determined to be "present" in the RGB distribution.

Returning to FIG. 2, the correlation coefficient determining unit 102h performs determination processing to determine whether the correlation coefficient related to the two-dimensional distribution is equal to or more than the predetermined threshold (calculation result determination processing) (Step SA-5). The correlation coefficient determining unit 102h may determine whether all of the correlation coefficients related to the two-dimensional distribution are equal to or more than the predetermined threshold.

The correlation coefficient determining unit 102h then determines whether the correlation coefficient related to the two-dimensional distribution is equal to or more than the predetermined threshold based on the determination result at Step SA-5 (Step SA-6). That is, the correlation coefficient determining unit 102h may determine whether the number of colors is small according to the RGB distribution and the correlation coefficient of each of RG, GB, and BR on the two-dimensional plane.

If the correlation coefficient determining unit 102h determines that the correlation coefficient is less than the predetermined threshold (No at Step SA-6), the determination of the color image data is maintained, and the processing is shifted to Step SA-7.

The correlation coefficient determining unit 102h adds a determination result of being the color image data (color determination) to the color image data with the determination maintained (Step SA-7), and the processing is ended.

On the other hand, if the correlation coefficient determining unit 102h determines that the correlation coefficient is equal to or more than the predetermined threshold (Yes at Step SA-6), the color image data is determined as the color convertible image data, and the processing is shifted to Step SA-8.

Figure 4:
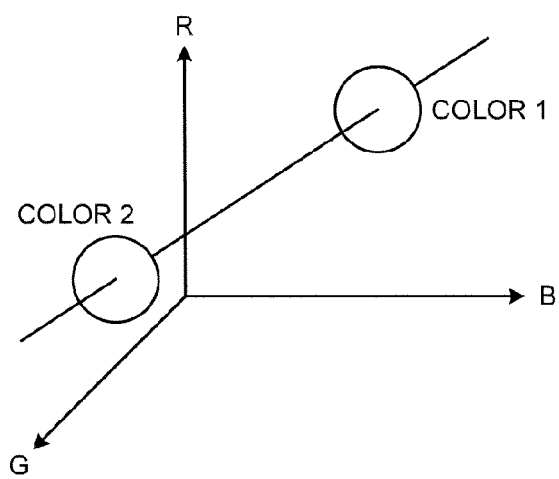
FIG. 4 is a conceptual diagram of an example of an RGB color space according to the embodiment.
Figure 5:
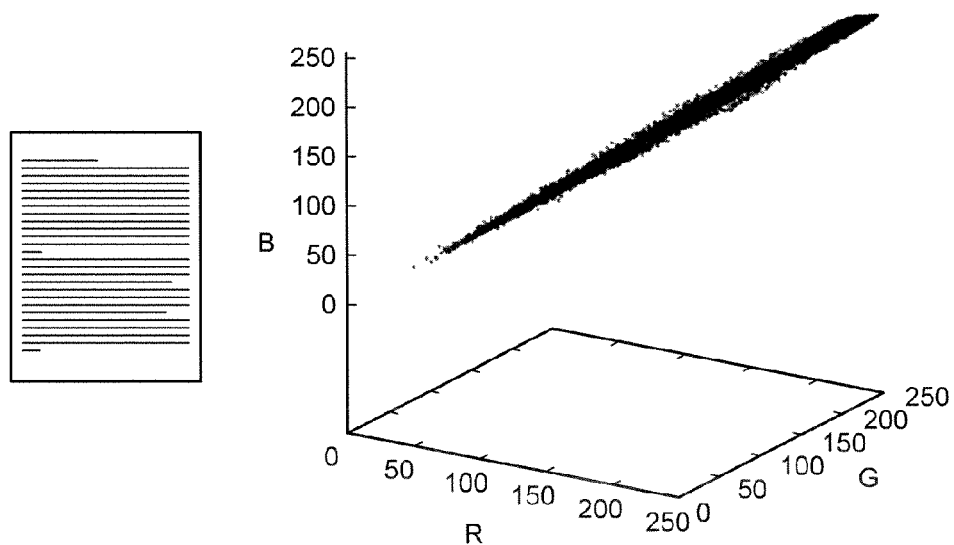
FIG. 5 is a diagram of an example of the RGB color space according to the embodiment.
Figure 6:
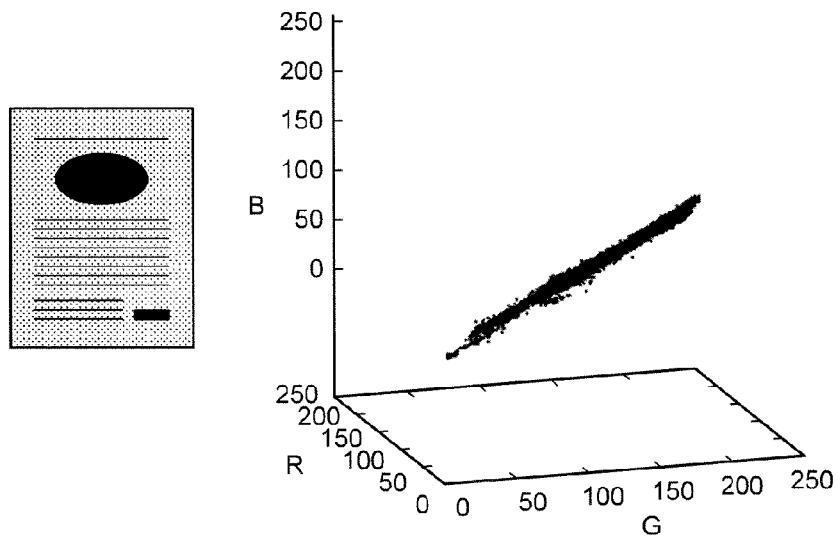
FIG. 6 is a diagram of an example of the RGB color space according to the embodiment.
Figure 7:
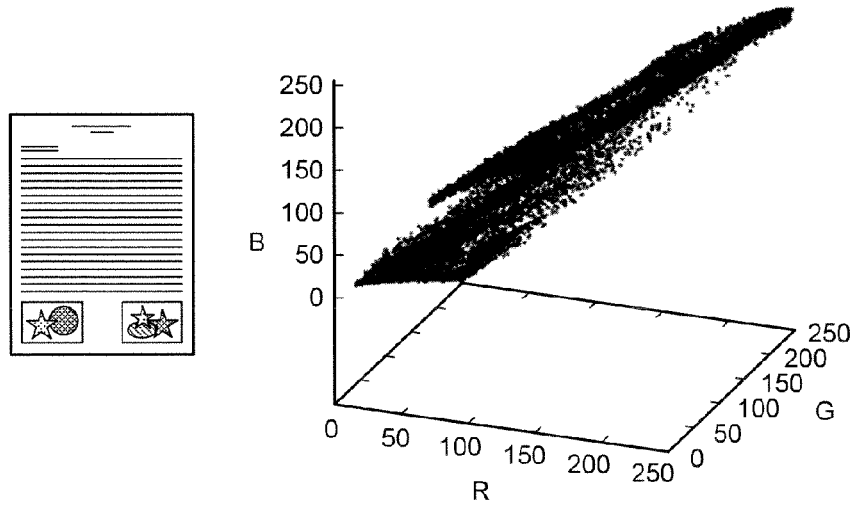
FIG. 7 is a diagram of an example of the RGB color space according to the embodiment.

The following explains an example of the color determination according to the embodiment with reference to FIGS. 4 to 7. FIG. 4 is a conceptual diagram of an example of the RGB color space according to the embodiment. FIGS. 5 to 7 are diagrams of an example of the RGB color space according to the embodiment.

As shown in FIG. 4, according to the embodiment, the color determination may be performed based on the fact that the image can be determined as a color image or a monochrome image depending on whether there are two groups color elements in the RGB color space. According to the embodiment, the color determination may be performed not only on a black-and-white original or a document the ground color of which is uniform but also on a document with two colors included in an image.

In data related to a document image having a small number of color types such as black-and-white image data as shown in FIG. 5 or red-and-black image data as shown in FIG. 6, linearity is found in the three-dimensional space of RGB, that is, a correlation is high, so that such image data may be determined as the color convertible image data according to the embodiment.

In data related to a document image such as image data with a photograph as shown in FIG. 7, there is no linearity in the three-dimensional space of RGB, that is, the correlation is low, so that such image data may be determined as the color image data according to the embodiment.

Therefore, according to the embodiment, the color convertible image data and the color image data may be determined utilizing characteristics in the RGB color space as shown in FIGS. 5 to 7.

In this way, the embodiment allows accurate determination at a high speed by determining that the number of colors is small based on the linearity in the RGB color space.

Returning to FIG. 2, the color information analyzing unit 102c performs determination processing (mono/gray determination processing) to determine whether the black-and-white image data or the color convertible image data can be converted into binary image data based on the color information of each pixel included in the black-and-white image data or the color convertible image data (Step SA-8).

The color information analyzing unit 102c determines whether the black-and-white image data or the color convertible image data can be converted into the binary image data based on the determination result at Step SA-8 (Step SA-9).

If the color information analyzing unit 102c determines that the black-and-white image data or the color convertible image data cannot be converted into the binary image data (for example, if the data is binarized, legibility of the image is significantly impaired) (No at Step SA-9), the processing is shifted to Step SA-10.

The color information analyzing unit 102c then adds a determination result indicating that the data can be converted into the gray scale image data (gray determination) to the black-and-white image data or the color convertible image data (Step SA-10), and the processing is ended.

On the other hand, if the color information analyzing unit 102c determines that the black-and-white image data or the color convertible image data can be converted into the binary image data (Yes at Step SA-9), the processing is shifted to Step SA-11.

The color information analyzing unit 102c adds a determination result indicating that the data can be converted into the binary image data (black-and-white binary image data) (monochrome determination) to the black-and-white image data or the color convertible image data (Step SA-11), and the processing is ended.

In this way, according to the embodiment, not only a simple black-and-white image or an image the ground color of which is a single color but also an image having a small number of colors are determined as a color convertible image (monochrome image) to reduce the size of original image data and improve the legibility thereof.

Processing (Part 2)

Figure 8:
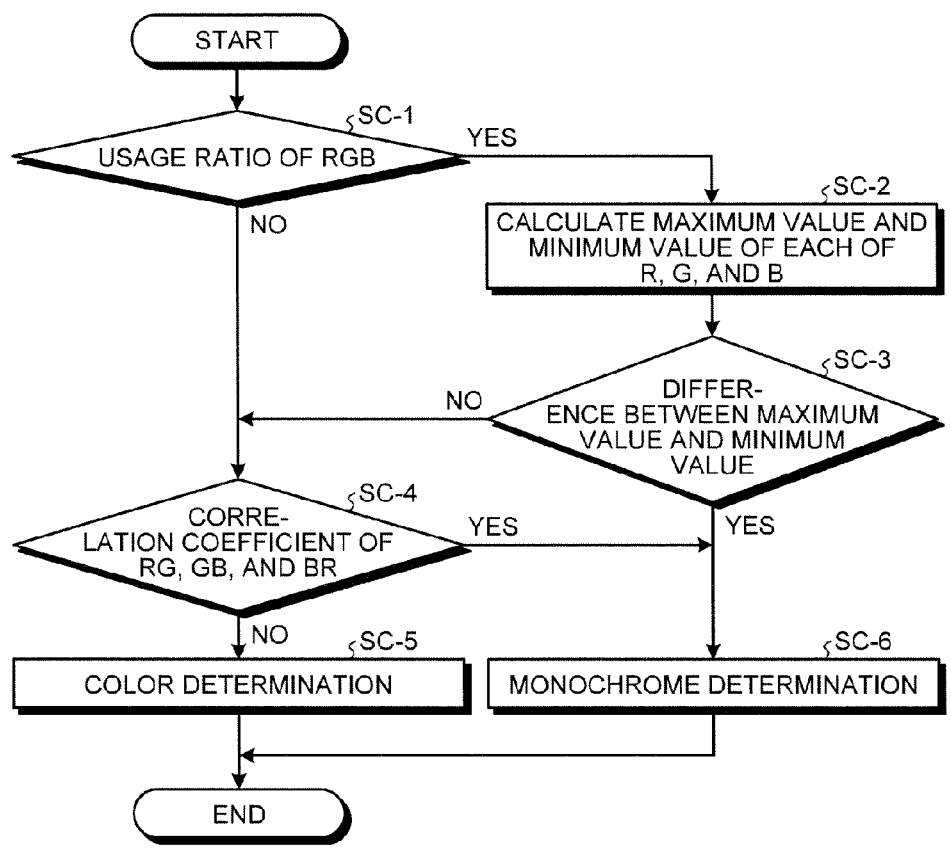
FIG. 8 is a flowchart of an example of the processing in the image-processing apparatus according to the embodiment.
Figure 9:
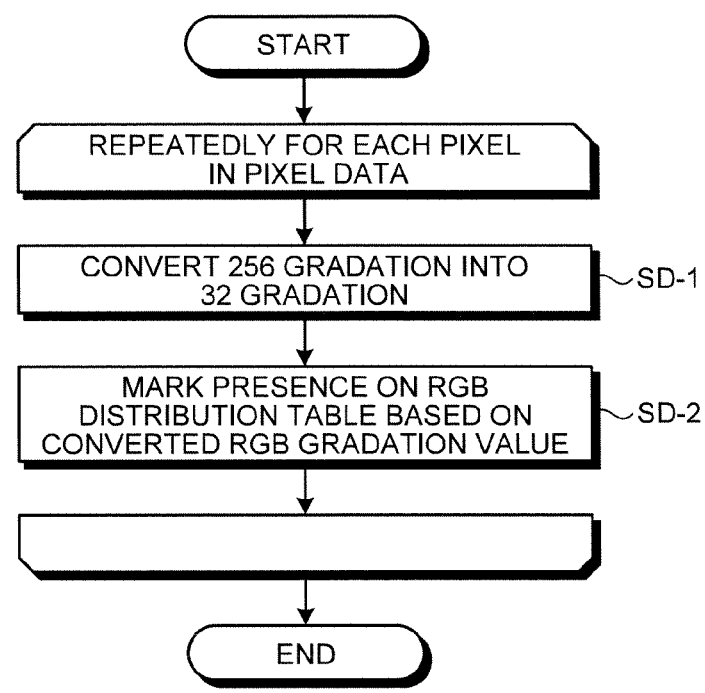
FIG. 9 is a flowchart of an example of the processing in the image-processing apparatus according to the embodiment.

Next, the following explains an example of the processing in the image-processing apparatus 100 according to the embodiment with reference to FIGS. 8 to 10. FIG. 8 is a flowchart of an example of the processing in the image-processing apparatus 100 according to the embodiment.

As shown in FIG. 8, the color distribution generating unit 102e first generates the three-dimensional distribution of the color information of the color image data in the RGB color space, and acquires the number of colors in the color image corresponding to the color image data based on the three-dimensional distribution. The ratio determining unit 102f determines whether the ratio (usage ratio) of the number of colors in the color image to the total number of colors corresponding to the entire RGB color space is less than a threshold (Step SC-1).

The following explains an example of color distribution generation processing according to the embodiment with reference to FIGS. 9 and 10. FIG. 9 is a flowchart of an example of the processing in the image-processing apparatus 100 according to the embodiment. FIG. 10 is a diagram of an example of color distribution according to the embodiment.

As shown in FIG. 9, the color distribution generating unit 102e first summarizes gradation values within a specific range for each pixel included in the color image data in the RGB color space, that is, converts 256 gradations into 32 gradations (Step SD-1).

The color distribution generating unit 102e then marks presence of the pixel on an RGB distribution table based on an RGB gradation value converted at Step SD-1 to generate the three-dimensional distribution of the pixel included in the color image data (Step SD-2), and the processing is ended.

As shown in FIG. 10, the color distribution generating unit 102e may mark the presence (or absence) of the pixel on the RGB distribution table.

Returning to FIG. 8, if the ratio determining unit 102f determines that the usage ratio of the number of colors in the color image to the total number of colors is equal to or more than the threshold (No at Step SC-1), the processing is shifted to Step SC-4.

On the other hand, if the ratio determining unit 102f determines that the usage ratio of the number of colors in the color image to the total number of colors is less than the threshold (Yes at Step SC-1), the processing is shifted to Step SC-2.

The ratio determining unit 102f then calculates a maximum value and a minimum value of each of RGB in the color image data in the RGB color space (Step SC-2).

The ratio determining unit 102f determines whether a difference between the calculated maximum value and the minimum value is less than the threshold (Step SC-3).

If the ratio determining unit 102f determines that the difference between the maximum value and the minimum value is less than the threshold (Yes at Step SC-3), the color image data is assumed to be the color convertible image data, and the processing is shifted to Step SC-6.

On the other hand, if the ratio determining unit 102f determines that the difference between the maximum value and the minimum value is equal to or more than the threshold (No at Step SC-3), the processing is shifted to Step SC-4.

The correlation coefficient calculating unit 102g generates three pieces of two-dimensional distribution of the color information of the color image data on the two-dimensional plane in the RGB color space, and calculates the correlation coefficient of each of RG, GB, and BR. The correlation coefficient determining unit 102h determines whether all of the correlation coefficients are equal to or more than the threshold (Step SC-4).

If the correlation coefficient determining unit 102h determines that any of the correlation coefficients is less than the threshold (No at Step SC-4), a determination result of being the color image data (color determination) is added to the color image data (Step SC-5), and the processing is ended.

On the other hand, if the correlation coefficient determining unit 102h determines that all of the correlation coefficients are equal to or more than the threshold (Yes at Step SC-4), the color image data is assumed to be the color convertible image data, and the processing is shifted to Step SC-6.

The correlation coefficient determining unit 102h then adds a determination result indicating that the data can be converted into the binary image data (black-and-white binary image data) (monochrome determination) to the color convertible image data (Step SC-6), and the processing is ended.

Processing (Part 3)

Figure 11:
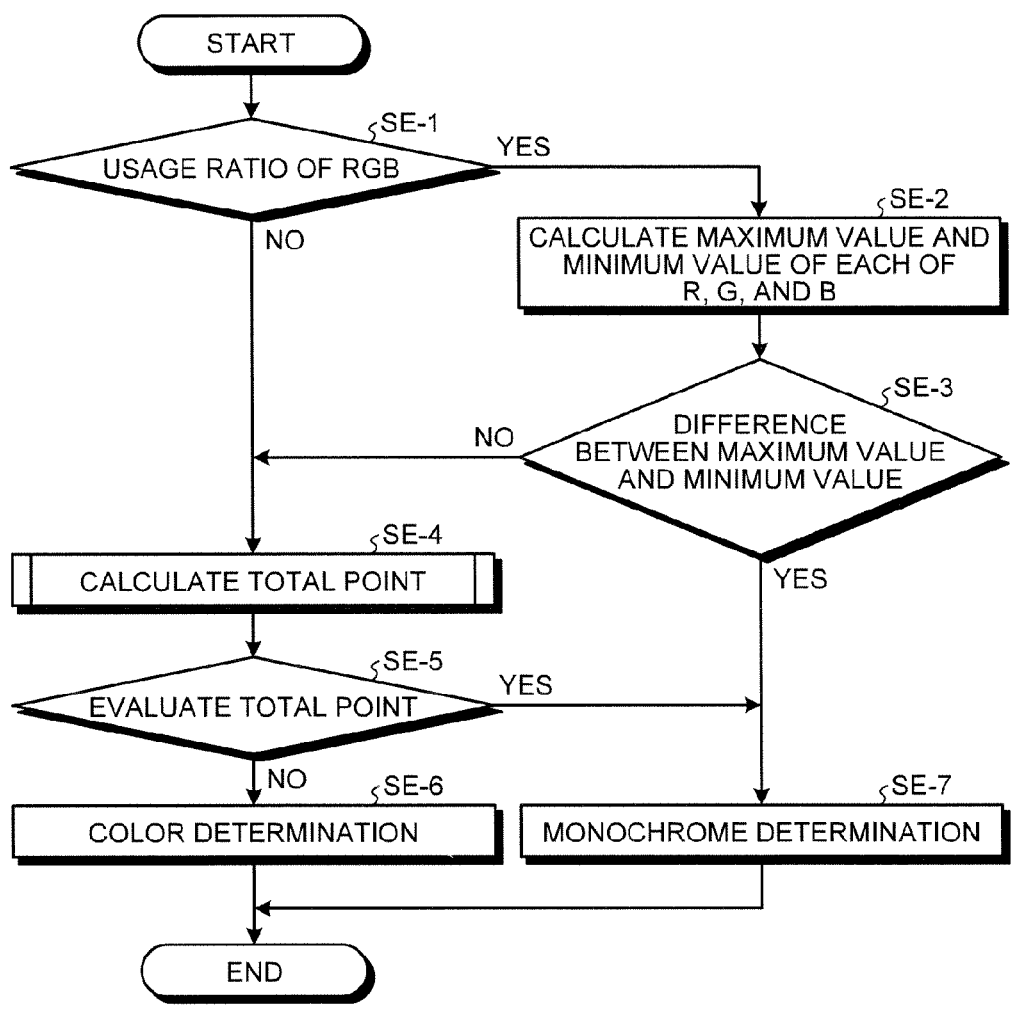
FIG. 11 is a flowchart of an example of the processing in the image-processing apparatus according to the embodiment.
Figures 12, 13:
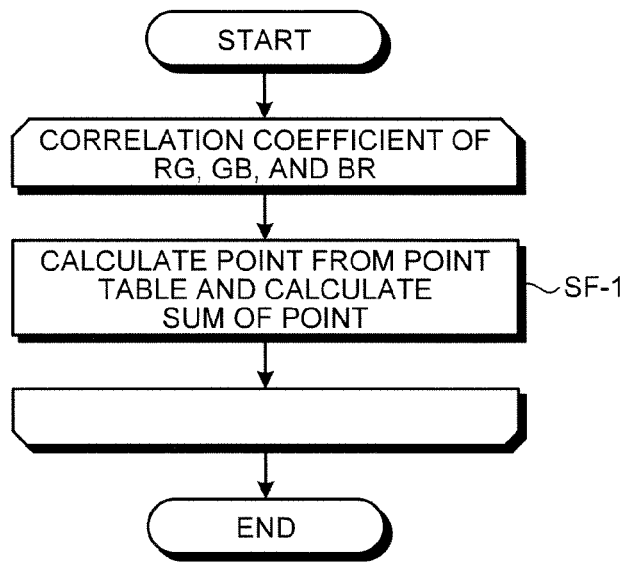
FIG. 12 is a flowchart of an example of the processing in the image-processing apparatus according to the embodiment.
FIG. 13 is a diagram of an example of a point table showing a correspondence between a correlation coefficient and a point according to the embodiment.

The following explains an example of the processing in the image-processing apparatus 100 according to the embodiment with reference to FIGS. 11 to 13. FIG. 11 is a flowchart of an example of the processing in the image-processing apparatus 100 according to the embodiment.

As shown in FIG. 11, the color distribution generating unit 102e first generates the three-dimensional distribution of the color information of the color image data in the RGB color space, and acquires the number of colors in the color image corresponding to the color image data based on the three-dimensional distribution. The ratio determining unit 102f determines whether the ratio (usage ratio) of the number of colors in the color image to the total number of colors corresponding to the entire RGB color space is less than the threshold (Step SE-1).

If the ratio determining unit 102f determines that the usage ratio of the number of colors in the color image to the total number of colors is equal to or more than the threshold (No at Step SE-1), the processing is shifted to Step SE-4.

On the other hand, if the ratio determining unit 102f determines that the usage ratio of the number of colors in the color image to the total number of colors is less than the threshold (Yes at Step SE-1), the processing is shifted to Step SE-2.

The ratio determining unit 102f then calculates the maximum value and the minimum value of each of RGB in the color image data in the RGB color space (Step SE-2).

The ratio determining unit 102f determines whether the difference between the calculated maximum value and the minimum value is less than the threshold (Step SE-3).

If the ratio determining unit 102f determines that the difference between the maximum value and the minimum value is less than the threshold (Yes at Step SE-3), the color image data is assumed to be the color convertible image data, and the processing is shifted to Step SE-7.

On the other hand, if the ratio determining unit 102f determines that the difference between the maximum value and the minimum value is equal to or more than the threshold (No at Step SE-3), the processing is shifted to Step SE-4.

The correlation coefficient calculating unit 102g generates three pieces of two-dimensional distribution of the color information of the color image data on the two-dimensional plane in the RGB color space, calculates each correlation coefficient related to the two-dimensional distribution, and calculates the sum of points (total point) calculated based on each correlation coefficient (Step SE-4).

The following explains an example of total point calculation processing according to the embodiment with reference to FIGS. 12 and 13. FIG. 12 is a flowchart of an example of the processing in the image-processing apparatus 100 according to the embodiment. FIG. 13 is a diagram of an example of a point table showing a correspondence between the correlation coefficient and the point according to the embodiment.

As shown in FIG. 12, the correlation coefficient calculating unit 102g calculates the point of each of the calculated correlation coefficients of RG, GB, and BR according to the point table as shown in FIG. 13, calculates the sum of the points (Step SF-1), and the processing is ended.

Returning to FIG. 11, the correlation coefficient determining unit 102h determines whether the total point is equal to or more than the threshold (evaluates the total point) (Step SE-5).

If the correlation coefficient determining unit 102h determines that the total point is less than the threshold (No at Step SE-5), a determination result of being the color image data (color determination) is added to the color image data (Step SE-6), and the processing is ended.

On the other hand, if the correlation coefficient determining unit 102h determines that the total point is equal to or more than the threshold (Yes at Step SE-5), the color image data is assumed to be the color convertible image data, and the processing is shifted to Step SE-7.

The correlation coefficient determining unit 102h adds a determination result indicating that the data can be converted into the binary image data (black-and-white binary image data) (monochrome determination) to the color convertible image data (Step SE-7), and the processing is ended.

In this way, according to the embodiment, the point is calculated from the correlation coefficient based on a specific table or expression such as when the threshold of the correlation coefficient is difficult to be clearly set, and if the total point of RG, GB, and BR is more than the predetermined threshold, the image may be determined as a monochrome image.

As explained above, according to the embodiment, the image having a small number of chromatic colors is determined with the input of the image including a chromatic color, and the image having a small number of colors may be determined to be able to be binarized. Therefore, according to the embodiment, even when there is the chromatic color in the image, the image can be assumed to be binarized, and capacity can be further reduced and legibility can be further improved than ever before.

The embodiment focuses on the fact that the linearity is found in the three-dimensional space of RGB when the number of chromatic colors is small in the color image data acquired from the scanner device 200.

According to the embodiment, data of each combination of RG, GB, and BR among R, G, and B values of each pixel included in the image data may be linearly approximated using a method of least squares to obtain the correlation coefficient.

According to the embodiment, when the correlation coefficients obtained for all combinations are more than a specific threshold, the data may be determined to be related to the image having a small number of chromatic colors. That is, according to the embodiment, the number of colors in the image may be obtained according to the correlation coefficient of each of RG, GB, and BR on the two-dimensional plane.

According to the embodiment, a result obtained by converting each correlation coefficient using a specific expression is assumed to be the point. If the total point is more than the threshold, the data is determined to be related to the image having a small number of chromatic colors, and the image data may be binarized.

In determination of the number of colors in the image through a check using a conventional histogram, the determination may be incorrect when the number of chromatic colors is small because an appearance frequency of the chromatic color is focused on. However, according to the embodiment, the image having a small number of colors can be easily determined as compared with a conventional method of finding a peak from the histogram.

In the conventional art, an amount of color image data acquired from the scanner device 200 is large, so that large storage capacity is required to store a large number of pieces of image data in a storage device, and much time is required to distribute the data via a network.

In the conventional art, even when only image data related to the image including no chromatic color is binarized, the size of the image data may not be sufficiently reduced in some cases because there are various pieces of image data.

According to the embodiment, the image data related to the image including no chromatic color and the image including a small chromatic color portion is automatically determined to be binarized, so that the amount of the image data is reduced while maintaining the legibility of the image.

Other Embodiments

The embodiment of the present disclosure is explained above. However, the present disclosure may be implemented in various different embodiments other than the embodiment described above within a technical scope described in claims.

For example, the image-processing apparatus 100 may perform processing on a standalone basis. The image-processing apparatus 100 may perform the processing in response to a request from a client terminal (separate body from the image-processing apparatus 100), and return a processing result to the client terminal.

All the automatic processes explained in the present embodiment can be, entirely or partially, carried out manually. Similarly, all the manual processes explained in the present embodiment can be, entirely or partially, carried out automatically by a known method.

The process procedures, the control procedures, specific names, information including registration data for each process and various parameters such as search conditions, display example, and database construction, mentioned in the description and drawings can be changed as required unless otherwise specified.

The constituent elements of the image-processing apparatus 100 and the scanner device 200 are merely conceptual and may not necessarily physically resemble the structures shown in the drawings.

For example, the process functions performed by each device of the image-processing apparatus 100 and the scanner device 200, especially the each process function performed by the control unit 102, can be entirely or partially realized by CPU and a computer program executed by the CPU or by hardware using wired logic. The computer program, recorded on a non-transitory tangible computer readable recording medium including programmed commands for causing a computer to execute the method of the present disclosure, can be mechanically read by the image-processing apparatus 100 as the situation demands. In other words, the storage unit 106 such as a read-only memory (ROM) or hard disk drive (HDD) stores the computer program that can work in coordination with an operating system (OS) to issue commands to the CPU and cause the CPU to perform various processes. The computer program is first loaded to a random access memory (RAM), and forms the control unit in collaboration with the CPU.

Alternatively, the computer program can be stored in any application program server connected to the image-processing apparatus 100 and the scanner device 200 via a network, and can be fully or partially downloaded as the situation demands.

The computer program may be stored in a computer-readable recording medium, or may be structured as a computer program product. Here, the "recording medium" includes any "portable physical medium" such as a memory card, a USB (Universal Serial Bus) memory, an SD (Secure Digital) card, a flexible disk, a magnetooptical disk, a ROM, an EPROM (Erasable Programmable Read Only Memory), an EEPROM (Electronically Erasable and Programmable Read Only Memory), a CD-ROM (Compact Disk Read Only Memory), an MO (Magneto-Optical disk), a DVD (Digital Versatile Disk), and a Blu-ray (registered trademark) Disc.

In addition, a "program" is a data processing method that is described in an arbitrary language or a description method and may have an arbitrary form such as a source code, a binary code, or the like. Furthermore, the "program" is not necessarily limited to a configuration of a single form and includes a configuration in which the program is configured by a plurality of modules or a plurality of program libraries in a distributed manner and includes a program that achieves the function thereof in cooperation with a separate program that is represented by an OS. In addition, as a specific configuration for reading data from a recording medium in each apparatus illustrated in the embodiments, a reading procedure, an installation procedure after the reading, and the like, a known configuration and a known procedure may be used.

Various databases and the like (image database 106a) stored in the storage unit 106 are storage units including, for example, any one, some, or all of a memory device such as a RAM or a ROM, a fixed disk device such as a hard disk, a flexible disk, and an optical disc, and may store any one, some, or all of various computer programs used for various pieces of processing or providing a Web site, a table, a database, a file for a Web page, and the like.

The image-processing apparatus 100 may be structured as an information processing apparatus such as known personal computers or workstations, or may be structured by connecting any peripheral devices to the information processing apparatus. Furthermore, the image-processing apparatus 100 may be realized by mounting software (including computer programs, data, or the like) for causing the information processing apparatus to implement the method according to the invention.

The distribution and integration of the device are not limited to those illustrated in the figures. The device as a whole or in parts can be functionally or physically distributed or integrated in an arbitrary unit according to various attachments or functional load. That is, any embodiments described above can be combined when implemented, or the embodiments can selectively be implemented.

According to the present disclosure, color conversion such as binarization or gray scaling can be performed not only on the image data having no chromatic color or a small portion of chromatic colors but also on the images having a small number of chromatic colors, so that the size of the image data can be further reduced. Therefore, according to the present disclosure, the capacity of a storage region for saving the image data can be reduced, time required to transfer the image data using a network and the like can be shortened, and the legibility of images can be improved.

The present disclosure can determine that, even when the number of chromatic colors in color image data is small, the data has a small number of chromatic colors.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image-processing apparatus comprising:
   a storage device, configured to store image data having color information in a three-dimensional color space;
   a CPU, configured to:
      generate a two-dimensional distribution of two dimensions of the color information of image data having color information in a three-dimensional color space;
      calculate a correlation coefficient related to the two-dimensional distribution;
      determine whether the image data constitutes color convertible image data based on the calculated correlation coefficient;
      if the image data is determined to constitute color convertible image data, convert the image data having color information in a three-dimensional color space to one of image data having black-and-white information or image data having gray scale information; and
      cause the converted image data to be stored in the storage device,
      whereby a storage size necessary to store the image data is reduced, while maintaining legibility, for mage data for an image without a chromatic color or with a small chromatic color.

2. The image-processing apparatus according to claim 1, wherein the CPU is further configured to:
generate a three-dimensional distribution of the color information of the image data in the three-dimensional color space;
acquire a number of colors in the image data based on the three-dimensional distribution; and
determine that the image data constitutes color convertible image data when a ratio of the number of colors to a total number of colors corresponding to the three-dimensional color space is less than is predetermined value.

3. The image-processing apparatus according to claim 2, wherein the CPU is configured to:
convert the color information having a first gradation into converted color information having a second gradation and
generates the three-dimensional distribution based on the converted color information.

4. The image-processing apparatus according to claim 3, wherein the first gradation is 256 gradations and the second gradation is 32 gradations.

5. The image-processing apparatus according to claim 1, wherein the determination that the image data constitutes color convertible image data based on the calculated correlation coefficient comprises:
determining that the image data constitutes color convertible image data when the calculated correlation coefficient is equal to or more than a predetermined threshold.

6. The image-processing apparatus according to claim 1, wherein the determination that the image data constitutes color convertible image data based on the calculated correlation coefficient comprises:
determining that the image data constitutes color convertible image data when is point calculated based on the calculated correlation coefficient is equal to or more than a predetermined threshold.

7. The image-processing apparatus according to claim 1, wherein the CPU is configured to:
generate three two-dimensional distributions of the color information, each for one pairing of the three dimensions of the three-dimensional color space; and
calculate three correlation coefficients, each related to one of the three two-dimensional distributions.

8. The image-processing apparatus according to claim 7, wherein the CPU is configured to:
determine that the image data constitutes color convertible image data when each of the three correlation coefficients are equal to or more than the predetermined threshold.

9. The image-processing apparatus according to claim 7, wherein the CPU is configured to:
determine that the image data constitutes color convertible image data when a sum of three points, each calculated based on a respective one of the three calculated correlation coefficients, is equal to or more than the predetermined threshold.

10. The image-processing apparatus according to claim 1, wherein the CPU is configured to convert the image data having color information in a three-dimensional color space to image data having black-and-white information.

11. The image-processing apparatus according to claim 1, wherein the CPU is configured to convert the image data having color information in a three-dimensional space to image data having gray scale information.

12. The image-processing apparatus according to claim 1, wherein the CPU is configured to:
calculate the correlation coefficient related to the two-dimensional distribution by using a method of least squares.

13. The image-processing apparatus according to claim 1, wherein the CPU is configured to:
convert the color information having a first gradation into converted color information having a second gradation,
generate the two-dimensional distribution based on the converted color information, and
calculate the correlation coefficient related to the two-dimensional distribution generated based on the converted color information.

14. The image-processing apparatus according to claim 13, wherein the first gradation is 256 gradations and the second gradation is 32 gradations.

15. The image-processing apparatus according to claim 1, wherein the three-dimensional color space is an RGB color space.

16. The image-processing apparatus according to claim 1, wherein the CPU is further configured to:
determine whether image data store in the storage device is image data having color information in a three-dimensional color space or image data having black-and-white information.

17. The image-processing apparatus according to claim 16, wherein the CUP is further configured to:
optimize any one or both of a pixel included in the image data and a data size.

18. An image-processing method comprising:
generating a two-dimensional distribution of two dimension of color information of image data, stored in a storage device, having color information in a three-dimensional color space; and
calculating a correlation coefficient related to the two-dimensional distribution;
determining whether the image data constitutes color convertible image data based on the calculated correlation coefficient;
if the image data is determined to constitute color copvertible image data, converting the image data having color information in a three-dimensional color space to one of image data having black-and-white information or image data having gray scale information; and
causing the converted image data to be stored in the storage device,
whereby a storage size necessary to store the image data is reduce, while maintaining legibility, for image data for an image without a chromatic color or with a chromatic color.

19. A non-transitory tangible computer readable medium including programmed instructions for causing, when executed by a computer, the computer to perform an image-processing method comprising:
generating a two-dimensional distribution of two dimensions of color information of image data, stored in a storage device, having color information in a three-dimensional color space;
calculating a correlation coefficient related to the two-dimensional distribution;
determining whether the image data constitutes color convertible image data based on the calculated correlation coefficient;

if the image data is determined to constitute color convertible image data, converting the image data having color information in a three-dimensional color space to one of image data having black-and-white information or image data having gray scale information; and causing the converted image data to be stored in the storage device, whereby a storage size necessary to store the image data is reduced, while maintaining legibility, for image data for an image without a chromatic color or with a small chromatic color.

* * * * *